United States Patent Office 2,788,362
Patented Apr. 9, 1957

2,788,362
PERCHLOROFLUORONITRILES AND METHODS FOR THEIR PREPARATION

William S. Barnhart, Cranford, and Joseph L. Zollinger, Bloomfield, N. J., assignors to The M. W. Kellogg Company, Jersey City, N. J., a corporation of Delaware No Drawing. Application May 18, 1955, Serial No. 509,408

14 Claims. (Cl. 260—465.2)

This invention relates to novel perchlorofluoronitriles and to methods for the preparation thereof.

The novel compounds of this invention may be produced by a number of methods; for example, they may be prepared by the dehydration of amides of perchlorofluorocarboxylic acids. They may also be prepared by reacting ammonia with a perchlorofluoroolefin having not in excess of about 19 carbon atoms.

The perchlorofluoronitriles prepared by the methods of this invention are useful as chemical intermediates in the preparation of ketones, amines, acids and the like, and they also are useful as surfactants, plasticizers, additives for lubricants, thickeners for greases, rubber softeners and flotation agents.

The preferred process for the preparation of the perchlorofluoronitriles of the invention is by the reaction of amides of perchlorofluorocarboxylic acids with an inorganic dehydrating agent. The amides which are used as reactants may be prepared according to the disclosure of copending application Serial No. 499,512, filed April 5, 1955. The preferred monoamides which may be used have the general formula,

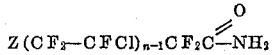

in which Z is chlorine or a perhalomethyl radical having a total atomic weight not in excess of 146.5, and $n$ is an integer from 2 to 10. Diamides preferably having the general formula,

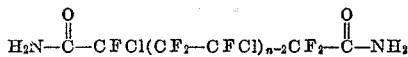

in which $n$ is an integer from 2 to 8, may also be used.

The amides of perchlorofluorocarboxylic acids are reacted with a dehydrating agent such as $P_2O_5$, $PCl_5$, $SOCl_2$, $NaCl \cdot AlCl_3$, $NH_4SO_3NH_2$, $KHSO_4$ or $H_2SO_4$. Of these, phosphorus pentoxide ($P_2O_5$) is preferred. The molar ratio of amide to dehydrating agent used in these reactions is between about 2:1 and about 1:10, preferably between about 1:1 and about 1:3, based on the use of a monoamide. If di- or polyamides are used, the amount of dehydrating agent is correspondingly increased. The reactants are mixed and heated to a temperature in the range of about 100 to about 350° C., preferably between about 150 and about 300° C. The crude nitrile begins to form immediately and the reaction may be continued for a period as long as six hours, but the reaction is generally completed within two hours.

The reaction of the higher molecular weight amides having 10 or more carbon atoms, for example, may be facilitated by heating them with a dehydrating agent under a reduced pressure in the range of about 5 to 100 mm. Hg absolute. The crude product, which is generally acidic, is purified by treatment with anhydrous potassium carbonate, a mixture of aluminum oxide and potassium hydroxide, and the like, or it may be taken up with ether, washed with sodium bicarbonate and water, dried and redistilled.

Where the nitriles are prepared by the reaction of ammonia with a perchlorofluoroolefin, a molar ratio of ammonia to olefin in the range of about 20:1 to about 3:1 is used. The reaction is conducted under pressure in a bomb at temperatures between about 0° C. and about 50° C.

The invention will be further illustrated by reference to the following specific examples:

EXAMPLE 1

*Preparation of* $Cl(CF_2—CFCl)_3CF_2CN$

A mixture of 0.1 mole of $Cl(CF_2—CFCl)_3CF_2CONH_2$ and 0.1 mole of $P_2O_5$ was heated in a 100 ml. flask provided with a short path distilling head. The product distilled at ~200° C./1 atm. (pot temp. 250–286° C.) over a 40 minute period to yield 0.0732 mole (73.2 percent) of a clear liquid having a pleasant aroma;

$$d_4^{20} = 1.804; \quad n_D^{20} = 1.3820$$

The crude acidic product was purified by filtering through a 1 inch layer of $K_2CO_3$ (anhydrous) and fractionating to give a neutral product, B. P. 118–120.5/50 mm.; $d_4^{20} = 1.795$; $n_D^{20} = 1.3800$; $MR_D$ calc. 59.0, found, 59.5. Infra-red analysis showed a sharp band at $4.42\mu$, good evidence for a triple bond.

*Analysis.*—Calc'd for $C_8NCl_4F_{11}$: N, 3.04. Found: N, 3.02 and 2.95.

EXAMPLE 2

A mixture of 21.1 grams (0.22 mole) of $(NH_4)_2CO_3$, 21.4 grams (0.22 mole) of $H_2NSO_3H$ and 96 grams (0.2 mole) of $Cl(CF_2—CFCl)_3CF_2CONH_2$ in a 250 ml. spherical flask was heated in an oil bath. Several mls. of water in addition to the product were distilled between 200–250° C. (bath temp.). The liquid product (48 grams) was fractionated to give 28 grams (0.061 mole; 30 percent) of $Cl(CF_2CFCl)_3CF_2CN$.

It will be obvious to those skilled in the art that many modifications may be made within the scope of the present invention without departing from the spirit thereof, and the invention includes all such modifications.

We claim:

1. A compound selected from the group of nitriles having the formula, $$Z(CF_2—CFCl)_{n-1}CF_2CN$$

in which Z is selected from the group consisting of chlorine and perhalomethyl radicals having a total atomic weight not in excess of 146.5, and $n$ is an integer from 2 to 10, and dinitriles having the formula,

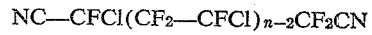

in which $n$ is an integer from 2 to 8.

2. A compound having the formula, $$Z(CF_2—CFCl)_{n-1}CF_2CN$$

in which Z is selected from the group consisting of chlorine and perhalomethyl radicals having a total atomic weight not in excess of 146.5, and $n$ is an integer from 2 to 10.

3. A compound having the formula, $$Cl(CF_2—CFCl)_{n-1}CF_2CN$$

in which $n$ is an integer from 2 to 10.

4. A compound having the formula,

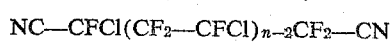

in which $n$ is an integer from 2 to 8.

5. A compound having the formula, $$Cl(CF_2—CFCl)_3CF_2CN$$

6. A process which comprises treating a compound selected from the group of monoamides having the formula, $$Z(CF_2-CFCl)_{n-1}CF_2\overset{O}{\underset{\|}{C}}-NH_2$$

in which Z is selected from the group consisting of chlorine and perhalomethyl radicals having a total atomic weight not in excess of 146.5, and $n$ is an integer from 2 to 10, and diamides having the formula, $$H_2N-\overset{O}{\underset{\|}{C}}-CFCl(CF_2-CFCl)_{n-2}CF_2\overset{O}{\underset{\|}{C}}-NH_2$$

in which $n$ is an integer from 2 to 8, with a dehydrating agent to produce the corresponding compounds selected from the group of nitriles having the formula, $$Z(CF_2-CFCl)_{n-1}CF_2CN$$

in which Z is selected from the group consisting of chlorine and perhalomethyl radicals having a total atomic weight not in excess of 146.5, and $n$ is an integer from 2 to 10, and dinitriles having the formula, $$NC-CFCl(CF_2-CFCl)_{n-2}CF_2CN$$

in which $n$ is an integer from 2 to 8.

7. A process for the preparation of a nitrile having the formula, $$Z(CF_2-CFCl)_{n-1}CF_2CN$$

in which Z is selected from the group consisting of chlorine and perhalomethyl radicals having a total atomic weight not in excess of 146.5, and $n$ is an integer from 2 to 10, which comprises treating a compound having the formula, $$Z(CF_2-CFCl)_{n-1}CF_2\overset{O}{\underset{\|}{C}}-NH_2$$

in which Z and $n$ are as given above, with a dehydrating agent.

8. A process for the preparation of a nitrile having the formula, $$Cl(CF_2-CFCl)_{n-1}CF_2CN$$

in which $n$ is an integer from 2 to 10, which comprises treating a compound having the formula, $$Cl(CF_2-CFCl)_{n-1}CF_2\overset{O}{\underset{\|}{C}}-NH_2$$

in which $n$ is as given above, with a dehydrating agent.

9. A process for the preparation of a dinitrile having the formula, $$NC-CFCl(CF_2-CFCl)_{n-2}CF_2-CN$$

in which $n$ is an integer from 2 to 8, which comprises treating a compound having the formula, $$H_2N-\overset{O}{\underset{\|}{C}}-CFCl(CF_2-CFCl)_{n-2}CF_2-\overset{O}{\underset{\|}{C}}-NH_2$$

in which $n$ is as given above, with a dehydrating agent.

10. A process in accordance with claim 6 in which the dehydrating agent comprises $P_2O_5$.

11. A process in accordance with claim 6 in which the dehydrating agent comprises $NH_4SO_3NH_2$.

12. A process in accordance with claim 6 in which the dehydrating agent comprises $PCl_5$.

13. A process in accordance with claim 6 in which the dehydrating agent comprises $SOCl_2$.

14. A process in accordance with claim 6 in which the dehydrating agent comprises $H_2SO_4$.

References Cited in the file of this patent

UNITED STATES PATENTS

| | | |
|---|---|---|
| 2,409,315 | Rigby et al. | Oct. 15, 1946 |
| 2,465,318 | Seymour | Mar. 22, 1949 |
| 2,520,181 | Teter et al. | Aug. 29, 1950 |
| 2,549,892 | Chaney | Apr. 24, 1951 |
| 2,554,786 | McBee et al. | May 29, 1951 |
| 2,567,011 | Diesslin et al. | Sept. 4, 1951 |
| 2,668,182 | Miller | Feb. 2, 1954 |
| 2,691,036 | Miller | Oct. 5, 1954 |
| 2,730,543 | Rendall et al. | Jan. 10, 1956 |